(12) United States Patent
Brady

(10) Patent No.: US 11,113,568 B2
(45) Date of Patent: Sep. 7, 2021

(54) DEVICES, SYSTEMS, AND METHODS FOR DEVICE-ERROR ANALYSIS USING COMPUTER VISION AND MACHINE LEARNING

(71) Applicant: CANON KABUSHIKI KAISHA, Tokyo (JP)

(72) Inventor: Nigel Brady, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 16/442,184

(22) Filed: Jun. 14, 2019

(65) Prior Publication Data
US 2020/0394457 A1    Dec. 17, 2020

(51) Int. Cl.
| | | |
|---|---|---|
| *G06K 9/62* | (2006.01) | |
| *G06K 9/00* | (2006.01) | |
| *G06N 3/04* | (2006.01) | |
| *G06N 20/20* | (2019.01) | |
| *H04N 1/00* | (2006.01) | |

(52) U.S. Cl.
CPC ....... *G06K 9/6256* (2013.01); *G06K 9/00744* (2013.01); *G06N 3/0454* (2013.01); *G06N 20/20* (2019.01); *H04N 1/00037* (2013.01)

(58) Field of Classification Search
None
See application file for complete search history.

(56) References Cited

U.S. PATENT DOCUMENTS

| | | | |
|---|---|---|---|
| 7,319,404 B2 | 1/2008 | Sturges | |
| 9,489,832 B2 | 11/2016 | Nair | |
| 9,665,843 B2* | 5/2017 | Smiley | G06Q 10/0635 |
| 10,073,664 B2 | 9/2018 | Skrainar | |
| 10,157,372 B2* | 12/2018 | Brailovskiy | G06Q 50/28 |
| 10,545,092 B2* | 1/2020 | Goodman | G01N 21/8806 |
| 2016/0171504 A1 | 6/2016 | Harriman | |
| 2016/0379176 A1 | 12/2016 | Brailovskiy | |
| 2018/0128749 A1 | 3/2018 | Goodman | |
| 2019/0034801 A1* | 1/2019 | Sodhani | G06N 3/088 |

OTHER PUBLICATIONS

Dang et al., "Facial expression recognition using a two stage neural network." In 2007 Mediterranean Conference on Control & Automation, pp. 1-7. IEEE, 2007. (Year: 2007).*
Canon, TS3100 series, Online Manual, pp. 1-174, Aug. 2017.
Canon, TS3100 series, Online Manual, pp. 175-341, Aug. 2017.
Canon, TS300 series, Online Manual, pp. 1-180, Nov. 2017.
Canon, TS300 series, Online Manual, pp. 181-369, Nov. 2017.

* cited by examiner

*Primary Examiner* — Feng Niu
(74) *Attorney, Agent, or Firm* — Canon U.S.A., Inc. IP Division

(57) ABSTRACT

Devices, systems, and methods obtain a video of a device, wherein the device includes one or more light emitters that are visible in the video; input the video to a first machine-learning model and executing the first machine-learning model, wherein the first machine-learning model outputs a time series of light-emitting states that indicate respective light-emitting states of the light emitters at respective times in the time series; and input the time series of light-emitting states to a second machine-learning model and executing the second machine-learning model, wherein the second machine-learning model outputs a status of the device.

18 Claims, 17 Drawing Sheets

|        | t = 1 | t = 2 | t = 3 | t = 4 | t = 5 |
|--------|-------|-------|-------|-------|-------|
| Light 1 | on | on | off | off | on |
| Light 2 | on | off | on | off | on |

$$\begin{bmatrix} 1 & 1 & 0 & 0 & 1 \\ 1 & 0 & 1 & 0 & 1 \end{bmatrix}$$

FIG. 13D

|        | t = 1 | t = 2 | t = 3 | t = 4 | t = 5 |
|--------|-------|-------|-------|-------|-------|
| Light 1 | on | on | off | off | on |

|        | t = 1 | t = 2 | t = 3 | t = 4 | t = 5 |
|--------|-------|-------|-------|-------|-------|
| Light 1 | on | on | off | off | on |
| Light 2 | on | off | on | off | on |
| Light 3 | off | off | on | on | on |

FIG. 13G

$$\begin{bmatrix} 1 & 1 & 0 & 0 & 1 \\ 1 & 0 & 1 & 0 & 1 \\ 0 & 0 & 1 & 1 & 1 \end{bmatrix}$$

DEVICES, SYSTEMS, AND METHODS FOR DEVICE-ERROR ANALYSIS USING COMPUTER VISION AND MACHINE LEARNING

BACKGROUND

Technical Field

This application generally concerns using computer vision to identify device errors.

Background

When using a printer, it is desirable for users to be able to quickly discern its operating condition. For example, if a printer has a paper jam or is out of ink, it is important to quickly notify the printer's user so that the issue may be resolved and the user can continue using the device. Some printers have only LEDs or 7-segment displays (or other non-rich screens) to alert their users of device issues. When these LEDs are lit or blink in a particular pattern, the users must search the printers' manuals to identify these patterns and determine what is wrong with their printer.

SUMMARY

Some embodiments of a device comprise one or more computer-readable storage media and one or more processors. The one or more processors are configured to cause the device to perform operations that include obtaining a video of a device, wherein the device includes one or more light emitters that are visible in the video; inputting the video to a first machine-learning model and executing the first machine-learning model, wherein the first machine-learning model outputs a time series of light-emitting states that indicate respective light-emitting states of the light emitters at respective times in the time series; and inputting the time series of light-emitting states to a second machine-learning model and executing the second machine-learning model, wherein the second machine-learning model outputs a status of the device.

Some embodiments of a method comprise obtaining a video of a device, wherein the device includes one or more light emitters that are visible in the video; generating a series of time-indexed frames based on the video; executing a first machine-learning model using the series of time-indexed frames as inputs, wherein the first machine-learning model outputs a time-indexed series of light-emitting states that indicate respective light-emitting states of the one or more light emitters at respective times in the time-indexed series; and executing a second machine-learning model using the time-indexed series of light-emitting states as inputs, wherein the second machine-learning model outputs a status of the device.

Some embodiments of one or more computer-readable storage media store computer-executable instructions that, when executed by one or more computing devices, cause the one or more computing devices to perform operations that comprise obtaining training data, wherein the training data includes time-indexed frames of at least one video of a device, wherein the device includes one or more light emitters, wherein the one or more light emitters are visible in the time-indexed frames, and wherein the training data indicates a respective light-emitting state of each of the one or more light emitters in each of the time-indexed frames; training a first machine-learning model based on the training data, wherein the first machine-learning model accepts time-indexed frames as inputs and outputs a time-indexed series of light-emitting states that indicates respective light-emitting states of the one or more light emitters at respective times; and training a second machine-learning model based on a plurality of time-indexed series of light-emitting states and on data that maps operating statuses of the device to respective time-indexed series of light-emitting states, wherein the operating statuses include one or more error statuses, and wherein the second machine-learning model accepts a time-indexed series of light-emitting states as an input and outputs an operating status of the device.

BRIEF DESCRIPTION OF THE DRAWINGS

FIGS. 13A-J illustrate example embodiments of time series of light-emitting states.

DESCRIPTION

The following paragraphs describe some explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1A:
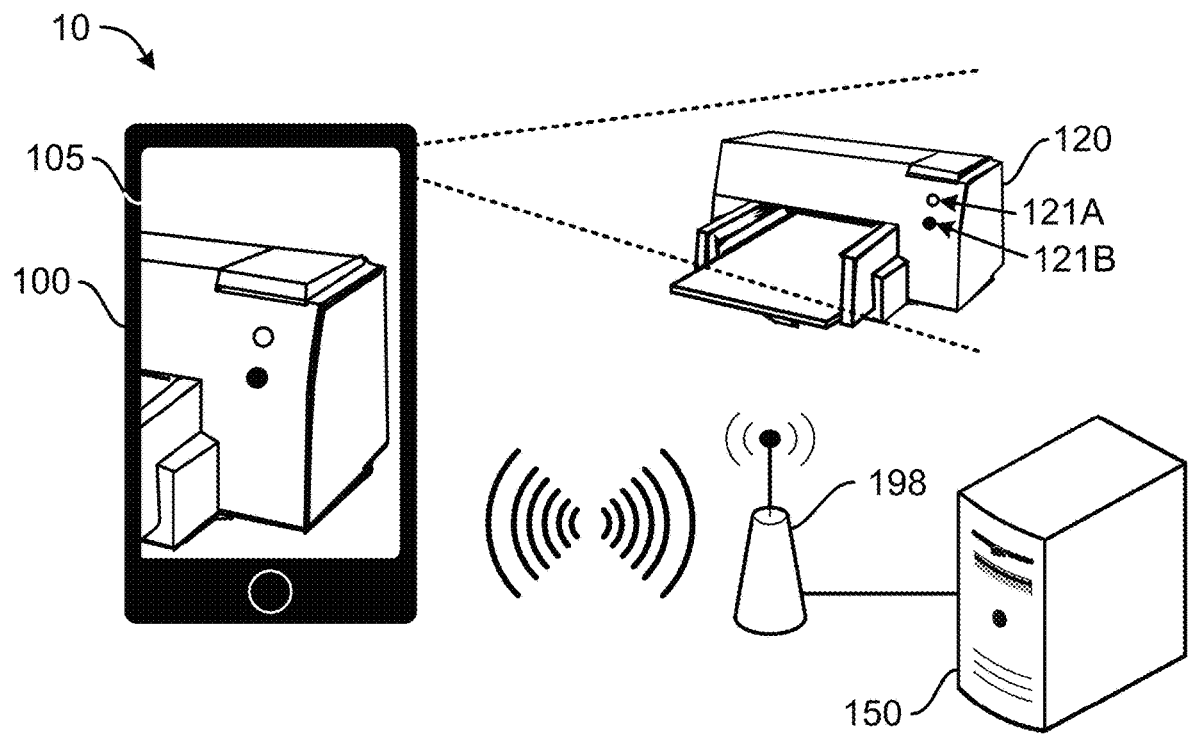
FIG. 1A illustrates an example embodiment of a device-status-detection system.

FIG. 1A illustrates an example embodiment of a device-status-detection system 10. The device-status-detection system 10 includes a computer-vision device 100, which is a specially configured computing device (e.g., a specially configured multi-purpose mobile computing device, such as a smartphone or a tablet computer; a specially configured laptop computer) and a device 120 that has limited output capabilities ("LOC device"), for example a peripheral device (e.g., a printing device, a scanner, a multi-function device) or an appliance (e.g., a dishwasher, a washing machine, a dryer, a refrigerator, a robotic vacuum cleaner). Some embodiments of the system 10 also include a remote computing device 150 (e.g., a specially configured server) that communicates with the computer-vision device 100 via an access point 198 and one or more networks.

The LOC device 120 includes one or more light emitters (e.g., an LED bulb, an incandescent bulb, an LCD screen, an LED screen). Although this embodiment of a LOC device 120 includes two light emitters 121A-B (e.g., LED bulbs), other embodiments may include only one light emitter or, alternatively, may include more than two light emitters. Also, some embodiments include other types of light emitters. The LOC device 120 is configured to activate the light emitters 121A-B to communicate information about the status of the LOC device 120. For example, the information about the status may indicate an error status (e.g., out of paper, paper jam, wrong paper size), a supply status (e.g., low ink, low paper), a communication status (e.g., wireless-network-connection status), or a normal-operation status.

To communicate the information about its status, the LOC device 120 may activate the light emitters 121A-B. Some embodiments of the LOC device 120 active the light emitters 121A-B in a pattern that is unique to a respective status. For example, to indicate a paper jam, the LOC device 120 may constantly activate a first light emitter 121A while not activating a second light emitter 121B. To indicate low ink, the LOC device 120 may alternately activate the first light emitter 121A and the second light emitter 121B (e.g., cause the first light emitter 121A and the second light emitter 121B to alternately blink). To indicate out of paper, the LOC device 120 may activate the first light emitter 121A in a pattern of three blinks in rapid succession followed by a pause, while activating the second light emitter 121B during the pause of the first light emitter 121A. In FIG. 1A, the first light emitter 121A has not been activated, and the second light emitter 121B has been activated.

Figure 1B:
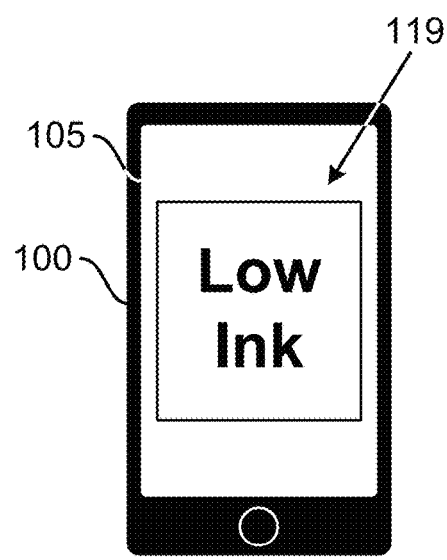
FIG. 1B illustrates an example embodiment of a computer-vision device that displays a status indicator of a device that has limited output capabilities.

The computer-vision device 100 captures a video of the light emitters 121A-B of the LOC device 120. Because the video includes frames (individual still images from the video) that show the light emitters 121A-B over a period of time, the video can show the patterns in the activation of the light emitters 121A-B. This example of a computer-vision device 100 includes a display device 105, and the computer-vision device 100 displays the video on the display device 105, for example a live feed as the video is captured. In some embodiments, the computer-vision device 100 determines the status of the LOC device 120 based on the video. Also, in some embodiments, the computer-vision device 100 uses the access point 198 to send the video to the remote computing device 150, which determines the status of the LOC device 120 based on the video and sends the status to the computer-vision device 100. As shown in FIG. 1B, the computer-vision device 100 uses the display device 105 to display a device-status indicator 119 of the LOC device 120.

Figure 2A:
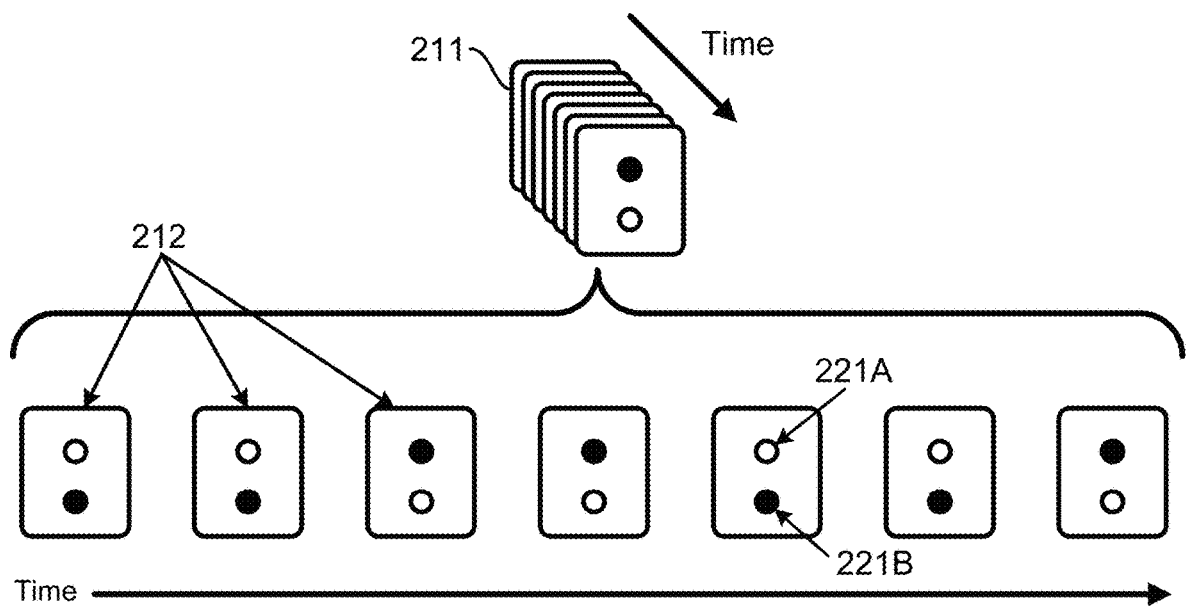
FIGS. 2A-C illustrate example embodiments of videos.
Figure 2B:
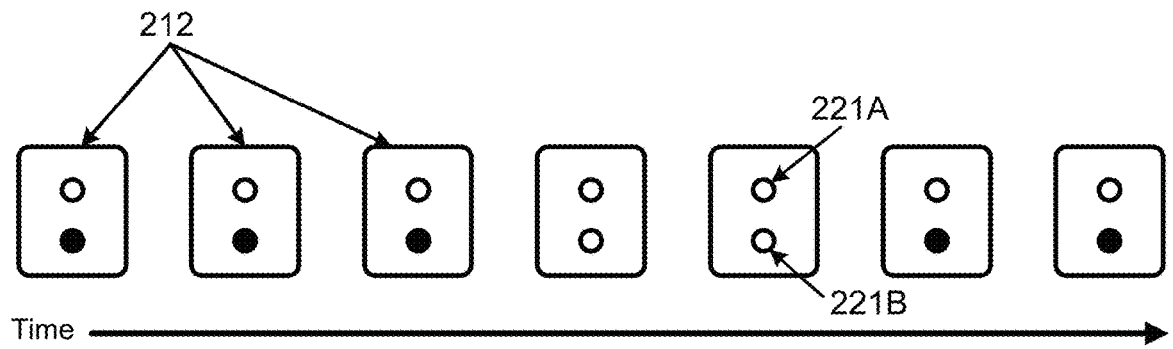
Figure 2C:
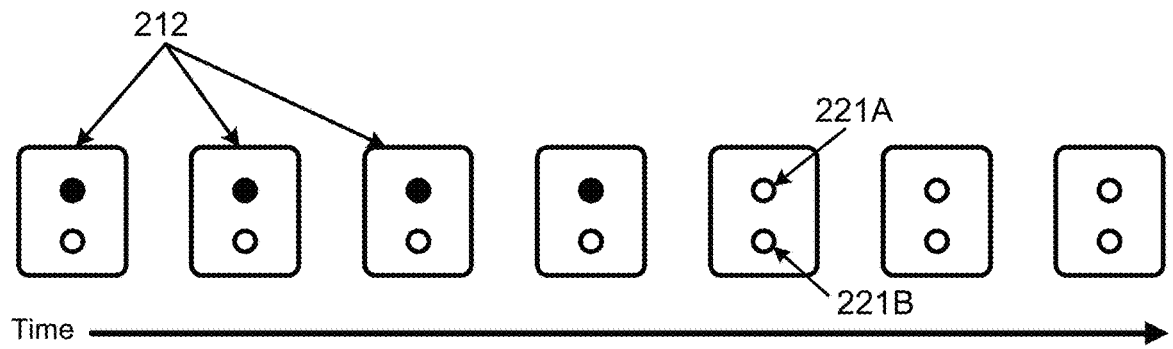

FIGS. 2A-C illustrate example embodiments of videos. In FIG. 2A, the video 211 includes a plurality of frames 212, which are arranged in order of capture. Each of the frames 212 shows the appearances of two light emitters 221A-B at the respective times that the frames 212 were captured. FIGS. 2B-C illustrate other embodiments of the frames 212 of a video. As shown by the frames 212 in FIGS. 2B-C, the light emitters 221A-B may activate and deactivate (e.g., blink) in patterns that are different from the pattern shown in FIG. 2A. Each of the patterns may indicate a respective device status.

Figure 3:
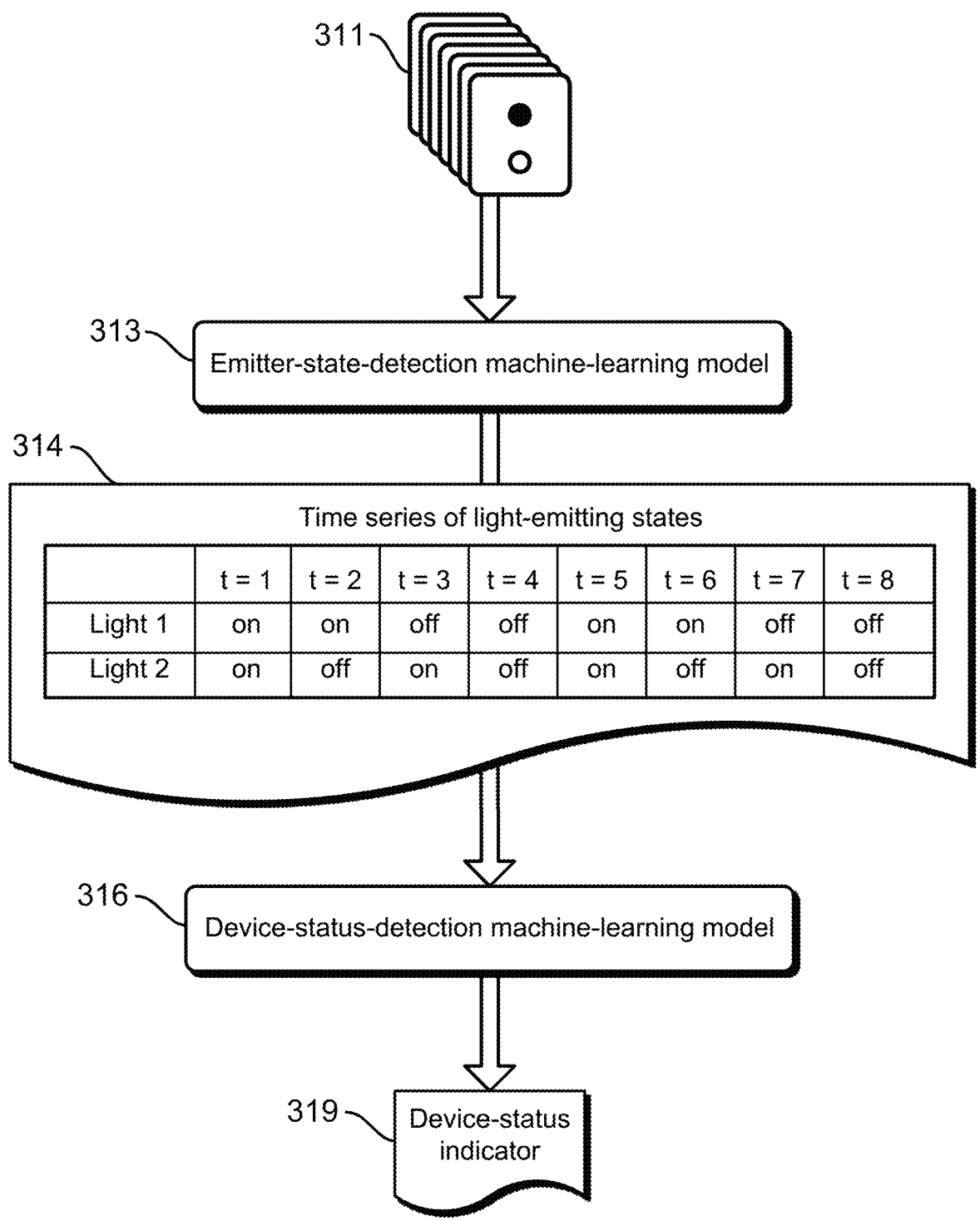
FIG. 3 illustrates example embodiments of an emitter-state-detection machine-learning model and a device-status-detection machine-learning model.

The computer-vision device 100 or the remote computing device 150 use one or more machine-learning models to determine the status of the LOC device 120 based on a video of the light emitters 121A-B of the LOC device 120. FIG. 3 illustrates example embodiments of an emitter-state-detection machine-learning model and a device-status-detection machine-learning model. The emitter-state-detection machine-learning model 313 accepts a video 311 as an input and generates a time series of detected light-emitting states 314 based on the video 311. The time series of light-emitting states 314 indicates the light-emitting states at respective time indexes. For example, the time series of light-emitting states 314 in FIG. 3 indicates that, at time index t=2, a first light emitter is on and a second light emitter is off. The time series of light-emitting states 314 in FIG. 3 also indicates that, at time index t=5, both the first light emitter and the second light emitter are on.

Also for example, some embodiments of the emitter-state-detection machine-learning model can be described by the following:

$$f(x1, x2, x3, \ldots ) = [y1, y2],$$

where f( ) is the emitter-state-detection machine-learning model, where x1, x2, x3, ... are the individual pixels in a frame, where y1 is 0 if LED1 is off and is 1 if LED1 is on, and where y2 is 0 if LED2 is off and is 1 if LED2 is on.

The device-status-detection machine-learning model 316 accepts a time series of light-emitting states 314 as an input and generates a device-status indicator 319 based on the time series of light-emitting states 314. The device-status indicator 319 indicates the status of the LOC device that has one or more light emitters that are depicted in the video 311. In some embodiments, if no error status is detected, the device-status-detection machine-learning model 316 outputs NULL as the device-status indicator 319.

Some embodiments of the device-status-detection machine-learning model 316 can be described by the following:

$$G\left(\begin{bmatrix} t_1, f(x_1, x_2 \ldots ) \\ \ldots \end{bmatrix}\right) = [e_1, e_2, \ldots ],$$

where G( ) is the device-status-detection machine-learning model, where $t_1$, $f(x_1, x_2 \ldots )$ is a matrix or a vector of time-indexed light-emitting states, where $e_1$ is 1 if a status of type $e_1$ (e.g., out of paper) is detected and is otherwise 0, and where $e_2$ is 1 if a status of type $e_2$ (e.g., paper jam) is detected and is otherwise 0.

Also, in some embodiments, only one machine-learning model is used. This machine-learning model accepts the video as an input and outputs a device-status indicator. For example, each frame in a video may be represented by a floating-point array whose length is commensurate with its size. Thus, for a 100×100 input frame that has three color channels (e.g., RGB), the frame's representation would be an array of 100 pixels*100 pixels*3 channels per pixel=30,000 array elements. The length of the video's array is proportional to the number of frames in the video. For example, in a one second video, captured at 30 frames per second, the size of the array would be 100 pixels*100 pixels*3 channels per pixel*30 frames=900,000 array elements. Additionally, this array could be represented by a four-dimensional (100×100×3×30) tensor.

Figure 4:
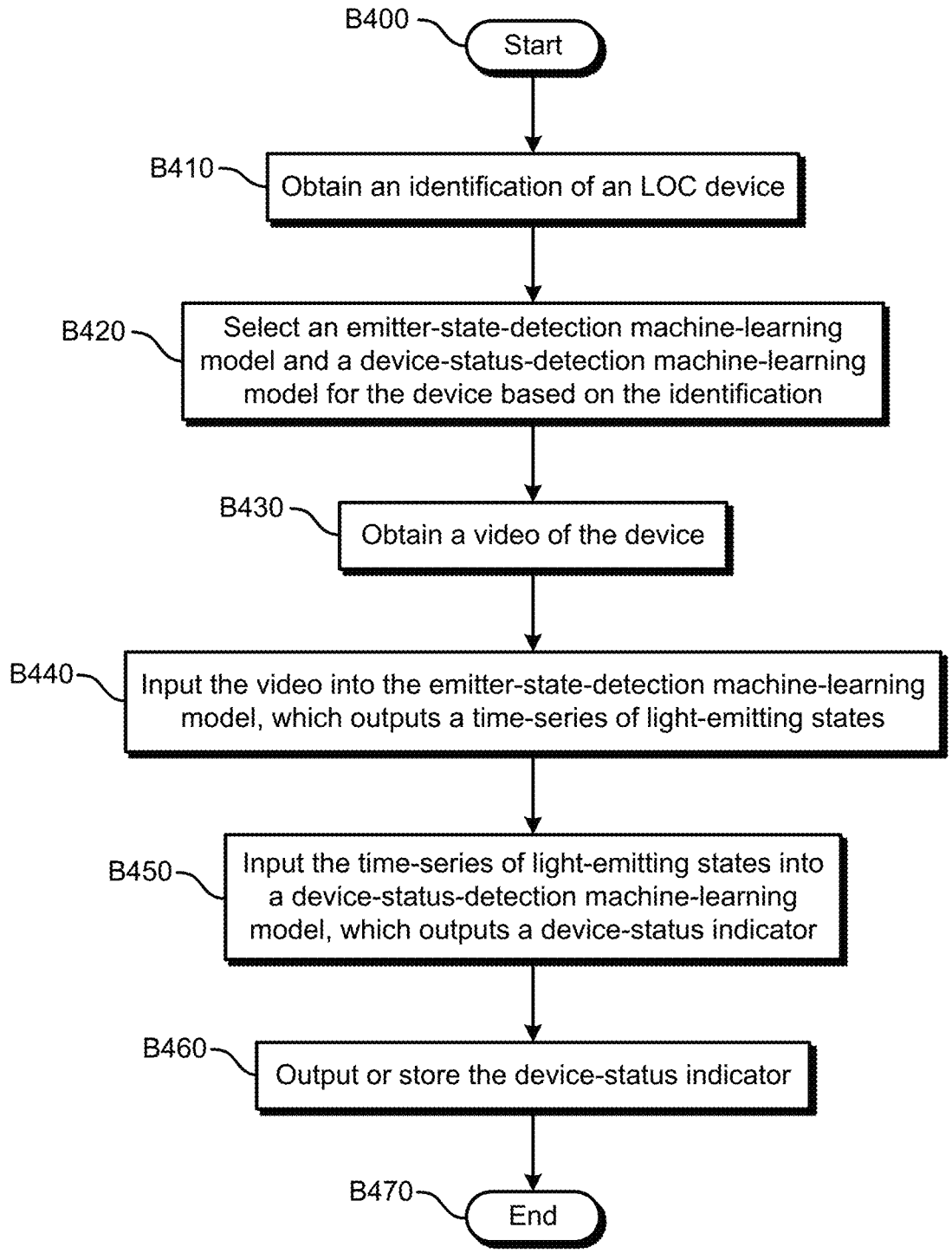
FIG. 4 illustrates an example embodiment of an operational flow for computer-vision detection of a device's status.

FIG. 4 illustrates an example embodiment of an operational flow for computer-vision detection of a device's status. Although this operational flow and the other operational flows that are described herein are presented in a certain order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations from more than one of the embodiments that are described herein. Thus, some embodiments of the operational flows may omit blocks, add blocks, change the order of the blocks, combine blocks, or divide blocks into more blocks relative to the example embodiments of the operational flows that are described herein.

Furthermore, although this operational flow and some of the other operational flows that are described herein are performed by a computer-vision device, some embodiments of these operational flows are performed by two or more computer-vision devices, by one or more other specially configured computing devices (e.g., specially configured remote computing device), or by some combination of one or more computer-vision devices and one or more other specially configured computing devices.

The operational flow in FIG. 4 starts in block B400 and then moves to block B410, where a computer-vision device obtains an identification of a LOC device (e.g., from a user input, from analyzing an image of the LOC device). For example, the identification may indicate the make and model of the LOC device. Next, in block B420, the computer-vision device selects an emitter-state-detection machine-learning model and a device-status-detection machine-learning model for the LOC device based on the identification (e.g., the model) of the LOC device. The machine-learning models may have been configured (e.g., trained) for the model of the LOC device.

Next, in block B430, the computer-vision device obtains (e.g., captures) a video of the LOC device. In some embodiments, the computer-vision device obtains the video and then uses the video to obtain an identification of the LOC device.

The flow then moves to block B440, where the computer-vision device inputs the video into the emitter-state-detection machine-learning model and executes the emitter-state-detection machine-learning model, which outputs a time series of light-emitting states. The flow then proceeds to block B450, where the computer-vision device inputs the time series of light-emitting states into the device-status-detection machine-learning model and executes the device-status-detection machine-learning model, which outputs a device-status indicator. Next, in block B460, the computer-vision device outputs or stores the device-status indicator. For example, the computer-vision device may output the device-status indicator by displaying it on a display device. The flow ends in block B470.

Figure 5:
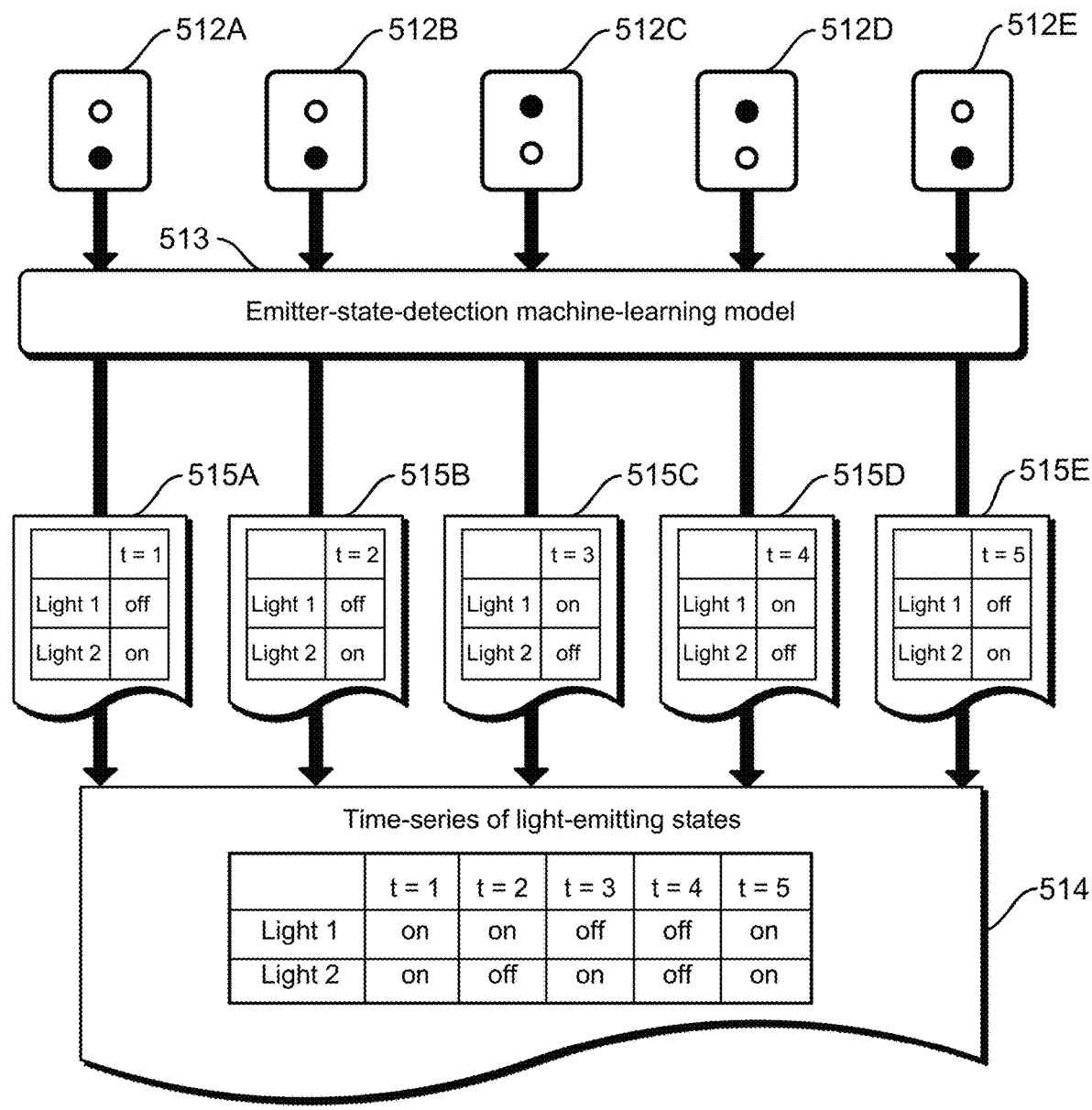
FIG. 5 illustrates an example embodiment of an emitter-state-detection machine-learning model.

FIG. 5 illustrates an example embodiment of an emitter-state-detection machine-learning model. This embodiment of the emitter-state-detection machine-learning model 513 accepts each frame 512A-E of a video as an input on a frame-by-frame basis and outputs a corresponding time-indexed light-emitting-state record 515A-E for each frame 512A-E. Each time-indexed light-emitting-state record 515A-E indicates a respective light-emitting state for each light emitter depicted in the corresponding frame 512A-E. For example, a first frame 512A shows two light emitters, and the corresponding time-indexed light-emitting-state record 515A includes a respective light-emitting state for each of the light emitters. If the frames 512A-E are time-indexed, the time index of the frame may be used as the time index of the corresponding time-indexed light-emitting-state record 515A-E. Also, the time indexes may be serially assigned to the time-indexed light-emitting-state records 515A-E in the order in which their respective frames 512A-E are input into the emitter-state-detection machine-learning model. A time series of light-emitting states 514 is composed of the time-indexed light-emitting states described by the time-indexed light-emitting-state records 515A-E.

Figure 6:
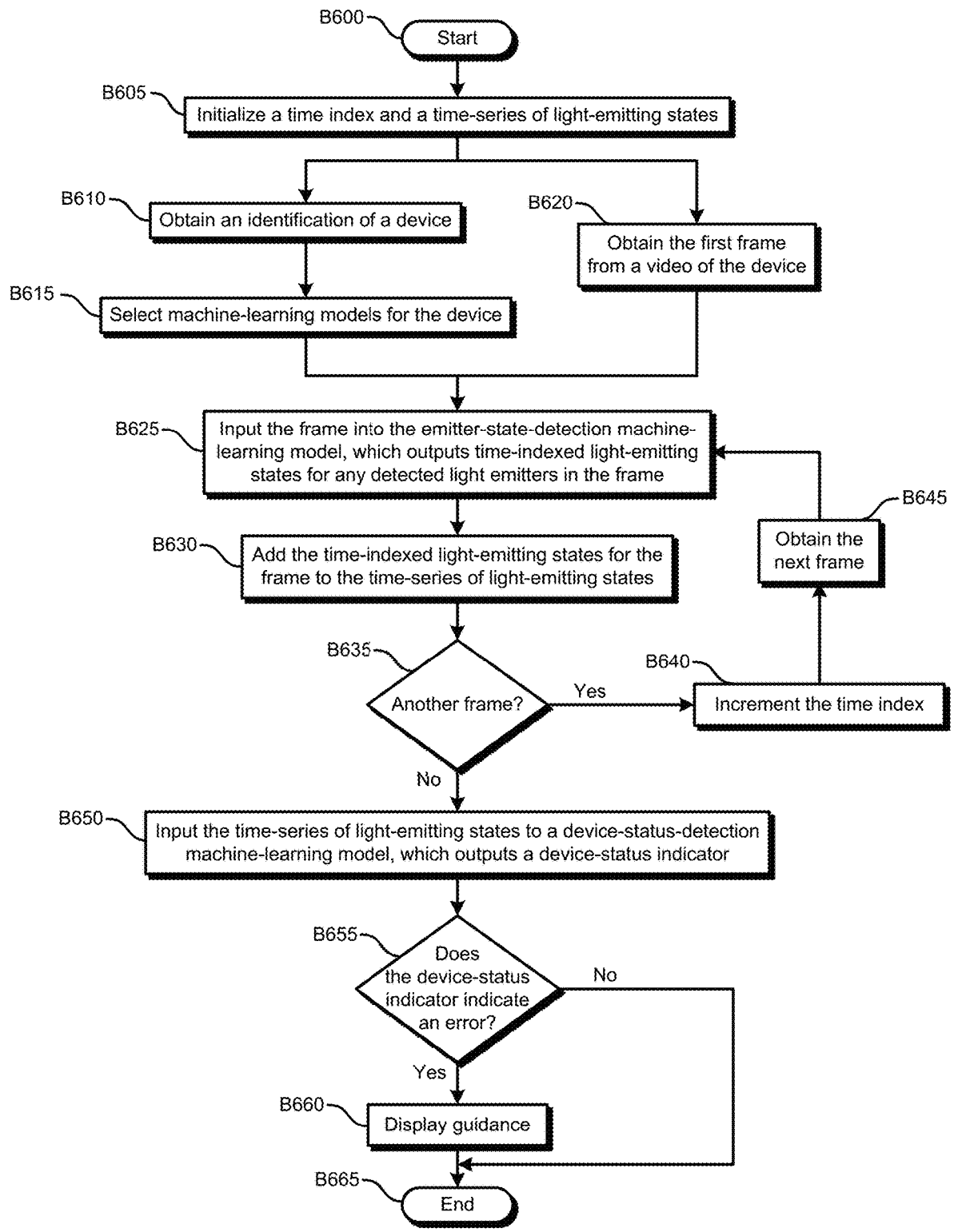
FIG. 6 illustrates an example embodiment of an operational flow for computer-vision detection of a device's status.

FIG. 6 illustrates an example embodiment of an operational flow for computer-vision detection of a device's status. The flow starts in block B600 and proceeds to block B605, where the computer-vision device initializes a time index and a time series of light-emitting states. For example, the time index may be set to one, and any previous time series of light-emitting states may be deleted from a memory or another storage location (e.g., a buffer). The flow then splits into a first flow and a second flow. The first flow moves to block B610, where the computer-vision device obtains an identification of a LOC device, and then moves to block B615, where the computer-vision device selects an emitter-state-detection machine-learning model and a device-status-detection machine-learning model for the LOC device based on the identification. The first flow then moves to block B625.

From block B605, the second flow proceeds to block B620, where the computer-vision device obtains at least the first frame from a video of the LOC device. In some embodiments, to obtain the frames of the video in blocks B620 and B645, the computer-vision device obtains the video and decomposes the video into one or more frames, which may be time indexed. Also, in embodiments that perform block B620 before block B610, the computer-vision device may use the at least one frame to obtain the identification of the LOC device, for example by visually recognizing the LOC device in the at least one frame. The second flow then moves to block B625.

The second flow rejoins the first flow in block B625, where the computer-vision device inputs the next frame (which is the first frame in the first iteration of block B625) into the emitter-state-detection machine-learning model and executes the emitter-state-detection machine-learning model, which outputs respective time-indexed light-emitting states for any detected light emitters in the frame. Next, in block B630, the computer-vision device adds the time-indexed light-emitting states for the frame to the time series of light-emitting states.

The flow then moves to block B635, where the computer-vision device determines whether the video includes another frame (e.g., if a video feed includes another frame). If the computer-vision device determines that the video does include another frame (B635=Yes), then the flow advances to block B640, where the computer-vision device increments the time index. The flow then moves to block B645, where the computer-vision device obtains the next frame in the video, and then the flow returns to block B625, where the next frame is input into the emitter-state-detection machine-learning model. Also, if the next frame is time-indexed, then the computer-vision device may set the time index to the next frame's time index.

If the computer-vision device determines that the video does not include another frame (B635=No), then the flow moves to block B650. In block B650, the computer-vision device inputs the time series of light-emitting states to a device-status-detection machine-learning model, which outputs a device-status indicator. Next, in block B655, the computer-vision device determines if the device-status indictor indicates an error. If the computer-vision device determines that the device-status indicator indicates an error (B655=Yes), then the flow moves to block B660. In block B660, the computer-vision device displays user guidance (e.g., printed instructions, a pre-recorded video, a mixed-reality display) to help a user resolve the error. Then the flow moves to block B665, where the flow ends.

And, if the computer-vision device determines that the device-status indicator does not indicate an error (B655=No), then, from block B655, the operational flow proceeds to block B665.

Figure 7:
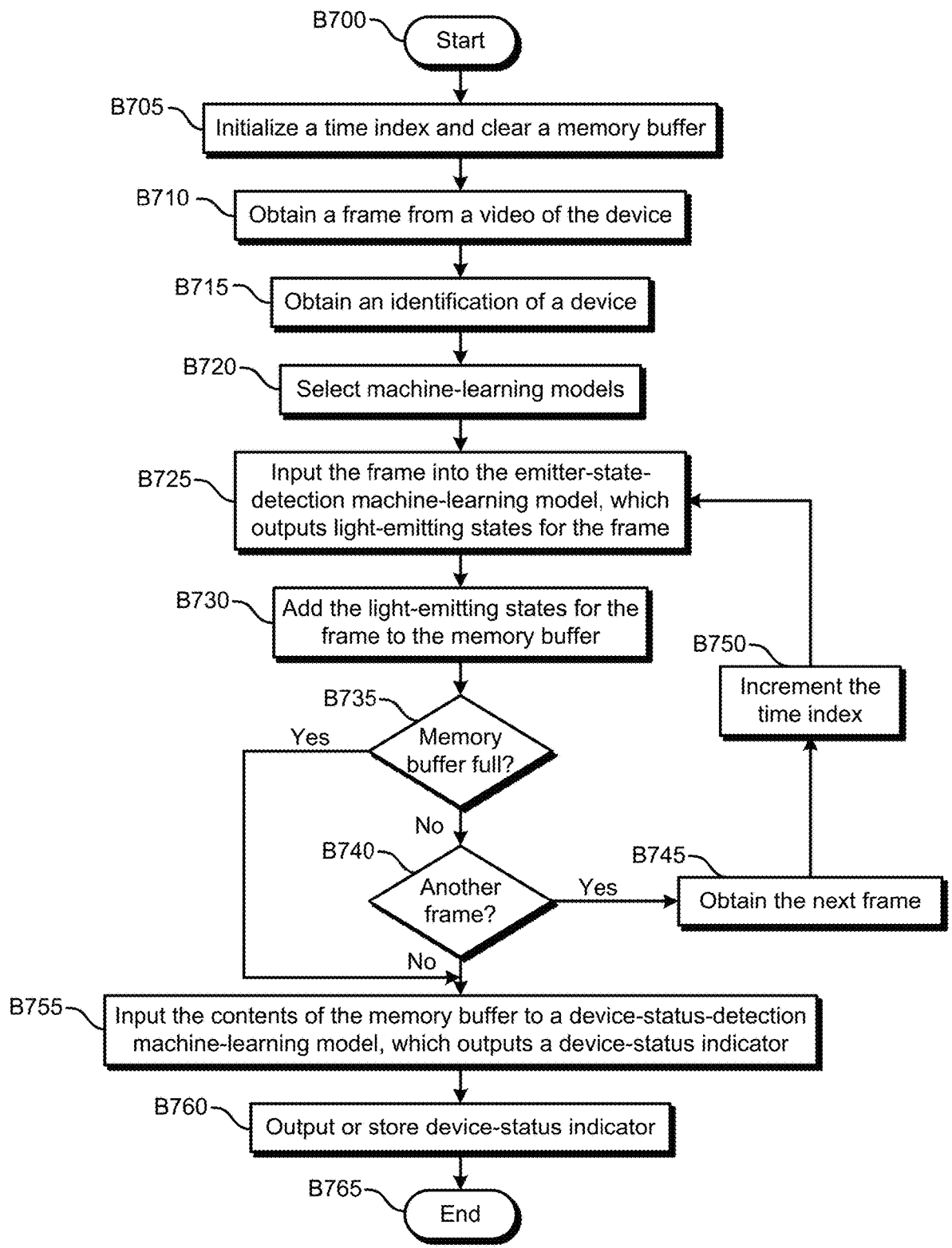
FIG. 7 illustrates an example embodiment of an operational flow for computer-vision detection of a device's status.

FIG. 7 illustrates an example embodiment of an operational flow for computer-vision detection of a device's status. The flow starts in block B700 and then proceeds to block B705, where a computer-vision device initializes a time index and clears a memory buffer. Next, in block B710, the computer-vision device obtains a frame from a video of the LOC device, for example as the computer-vision device captures a video of the LOC device. The flow then moves to block B715, where the computer-vision device obtains an identification of the LOC device (e.g., by identifying the LOC device based on the frame, by retrieving an identification that was previously input by a user from a memory location). In some embodiments, the computer-vision device obtains the identification by receiving a user selection of the identification. Then, in block B720, the computer-vision device selects an emitter-state-detection machine-learning model and a device-status-detection machine-learning model based on the identification of the LOC device.

The flow then proceeds to block B725, where the computer-vision device inputs the frame into the emitter-state-detection machine-learning model and executes the emitter-state-detection machine-learning model, which outputs one or more light-emitting states for the frame. In block B730, the computer-vision device adds the one or more light-emitting states for the frame to the memory buffer. Next, in block B735, the computer-vision device determines whether the memory buffer is full. If the computer-vision device determines that the memory buffer is full (B735=Yes), then the flow moves to block B755.

However, if the computer-vision device determines that the buffer is not full (B735=No), then the flow moves to block B740. In block B740, the computer-vision device determines whether the video includes another frame. If the computer-vision device determines that the video includes another frame (B740=Yes), then the flow moves to block B745, where the computer-vision device obtains the next frame, and then to block B750, where the computer-vision device increments the time index. Also, if the next frame includes a respective time index, some embodiments of the computer-vision device obtain the next frame and then change the time index to match the time index of the next frame. After block B750, the flow returns to block B725, where the computer-vision device inputs the next frame into the emitter-state-detection machine-learning model.

If the computer-vision device determines that the video does not include another frame (B740=No), then the flow moves to block B755.

In block B755, the computer-vision device inputs the contents of the memory buffer to a device-status-detection machine-learning model and executes the device-status-detection machine-learning model. The buffer's contents are the light-emitting states that were added during the iterations of block B730, and the device-status-detection machine-learning model outputs a device-status indicator based on the light-emitting states. Next, in block B760, the computer-vision device outputs or stores the device-status indicator, and then the flow ends in block B765.

Figure 8:
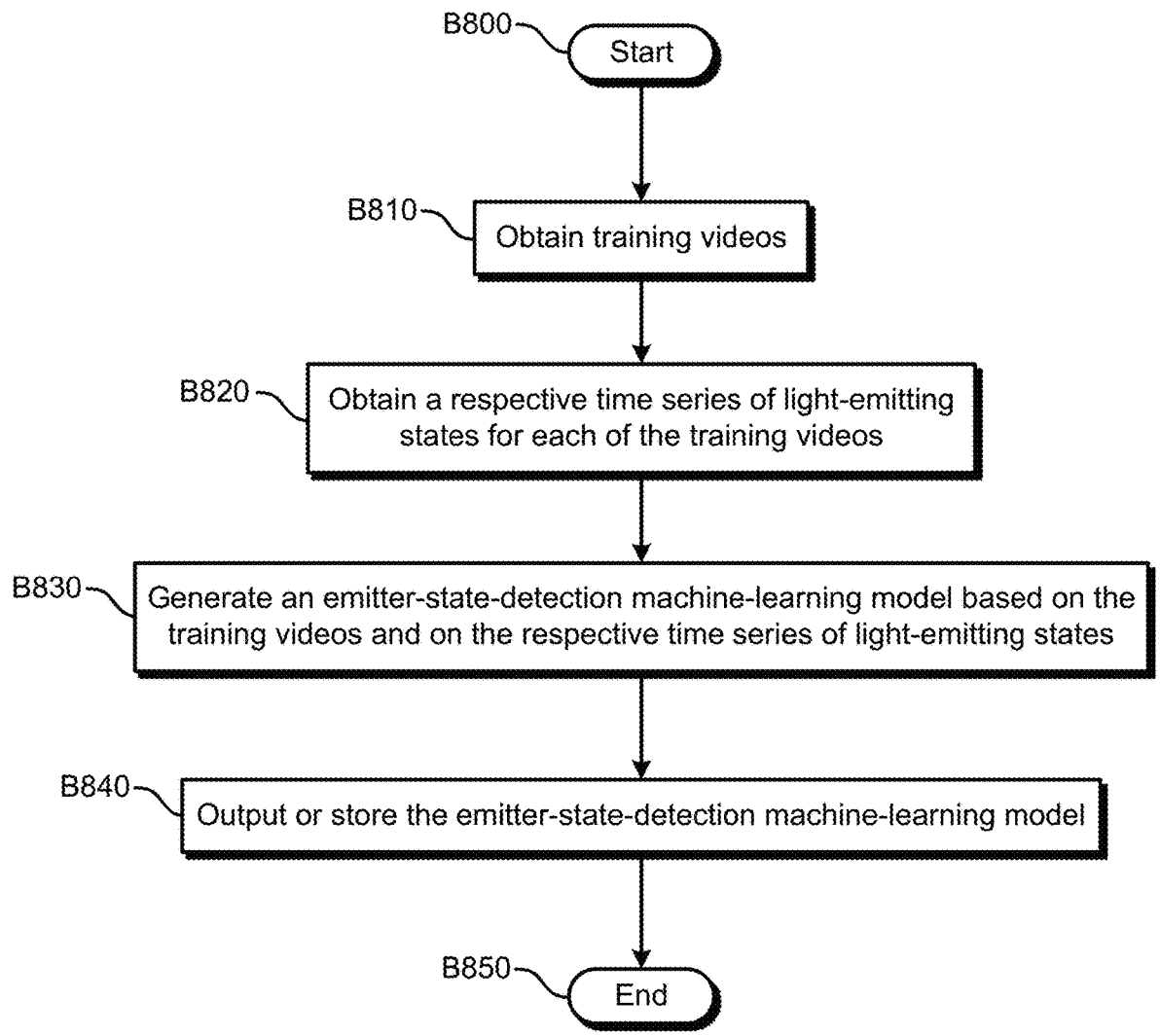
FIG. 8 illustrates an example embodiment of an operational flow for generating an emitter-state-detection machine-learning model.

FIG. 8 illustrates an example embodiment of an operational flow for generating an emitter-state-detection machine-learning model. Although this operational flow and some of the other operational flows that are described herein are performed by a model-generation device, some embodiments of these operational flows are performed by two or more model-generation devices, by one or more other specially configured computing devices, or by a combination of one or more model-generation devices and one or more other specially configured computing devices.

The flow starts in block B800 and then moves to block B810, where a model-generation device obtains one or more training videos of a LOC device. Next, in block B820, the model-generation device obtains a plurality of time series of light-emitting states, which include a respective time series of light-emitting states for each of the training videos. The flow then moves to block B830, where the model-generation device generates an emitter-state-detection machine-learning model based on the training videos and on the plurality of time series of light-emitting states. For example, the emitter-state-detection machine-learning model may be a neural network (e.g., a deep neural network, a convolutional neural network). And, to generate a neural network, the model-generation device may train the neural network using the training videos and the plurality of time series of light-emitting states. Next, in block B840, the model-generation device outputs or stores the emitter-state-detection machine-learning model, and the flow ends in block B850.

Figure 9:
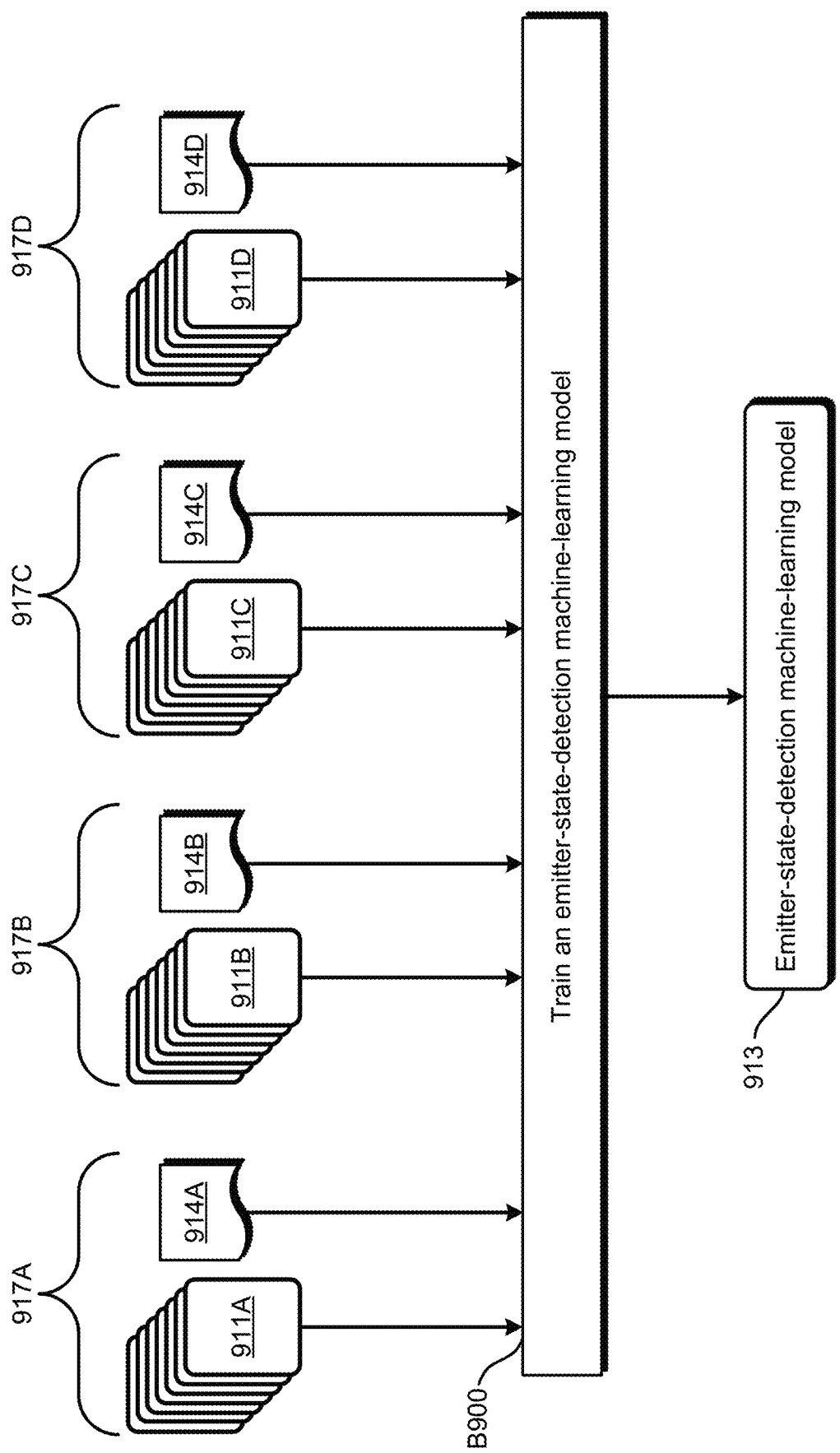
FIG. 9 illustrates the training of an embodiment of an emitter-state-detection machine-learning model.

FIG. 9 illustrates the training of an embodiment of an emitter-state-detection machine-learning model. The inputs to the training are data pairs 917A-D. Each data pair 917A-D includes a respective video and the video's respective time series of light-emitting states. In this example, a first data pair 917A includes a first video 911A and a first time series of light-emitting states 914A, a second data pair 917B includes a second video 911B and a second time series of light-emitting states 914B, a third data pair 917C includes a third video 911C and a third time series of light-emitting states 914C, and a fourth data pair 917D includes a fourth video 911D and a fourth time series of light-emitting states 914D. The data pairs 917A-D are input to block B900, where a model-generation device trains an emitter-state-detection machine-learning model 913 based on the data pairs 917A-D.

Figure 10:
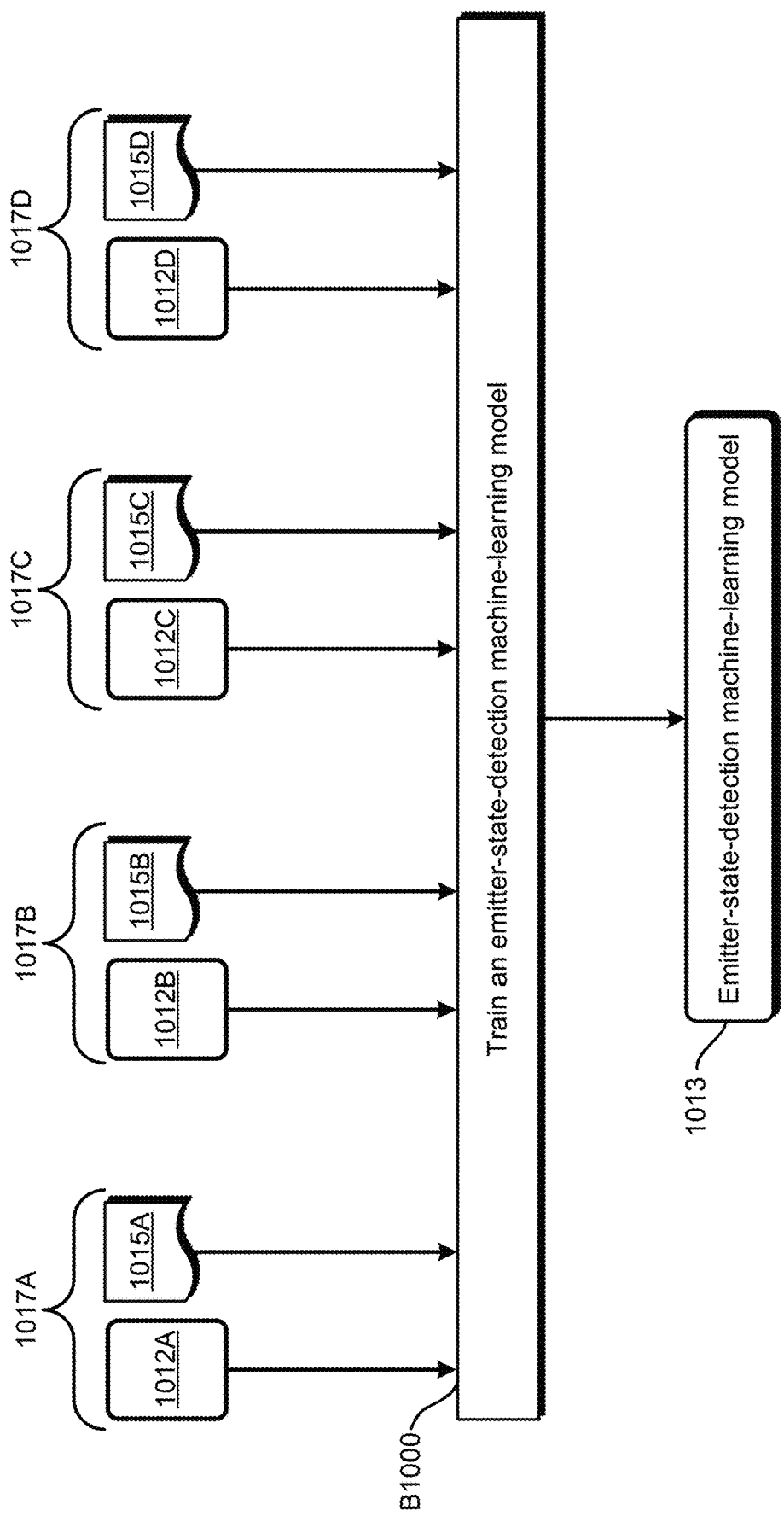
FIG. 10 illustrates the training of an embodiment of an emitter-state-detection machine-learning model.

FIG. 10 illustrates the training of an embodiment of an emitter-state-detection machine-learning model. The inputs to the training are data pairs 1017A-D. Each data pair 1017A-D includes a respective frame and the frame's respective light-emitting states. In this example, a first data pair 1017A includes a first frame 1012A and first light-emitting states 1015A, a second data pair 1017B includes a second frame 1012B and second light-emitting states 1015B, a third data pair 1017C includes a third frame 1012C and third light-emitting states 1015C, and a fourth data pair 1017D includes a fourth frame 1012D and fourth light-emitting states 1015D. The data pairs 1017A-D are input to block B1000, where a model-generation device trains an emitter-state-detection machine-learning model 1013 based on the data pairs 1017A-D.

Figure 11A:
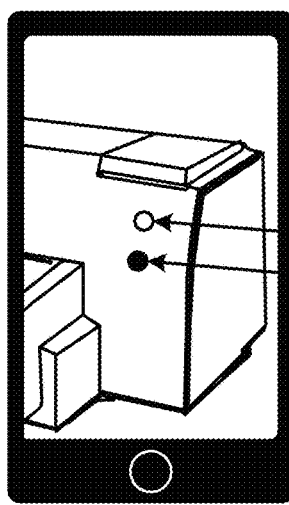
FIGS. 11A-F illustrate example embodiments of training frames.
Figure 11B:
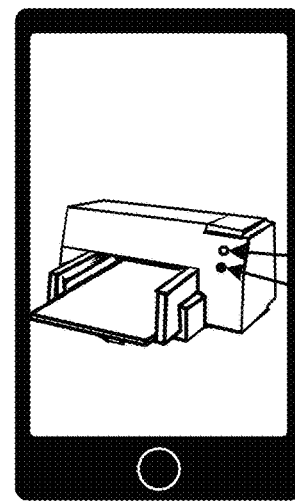
Figure 11C:
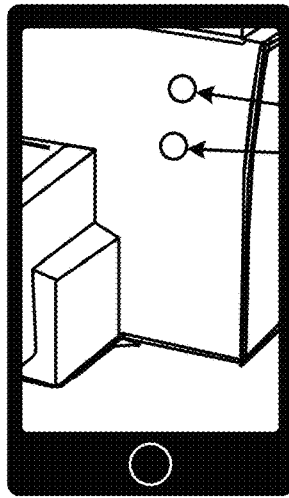
Figure 11D:
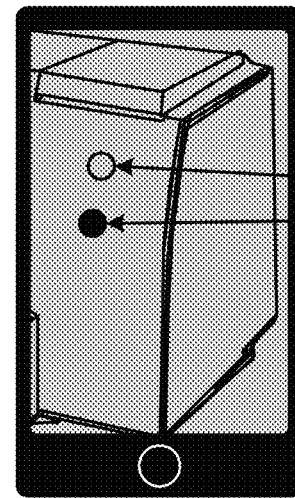
Figure 11E:
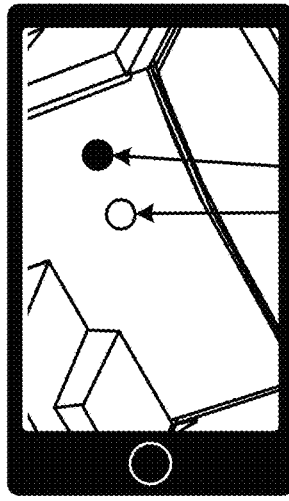
Figure 11F:
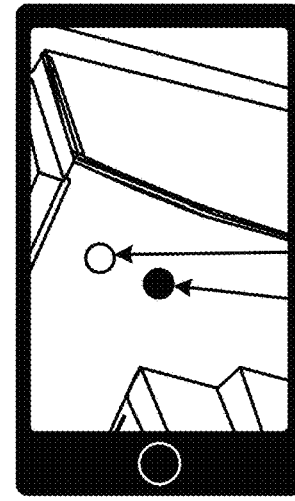

The videos or frames that are used to generate (e.g., train) the emitter-state-detection machine-learning model may show the light emitters of a LOC device from a variety of viewpoints and in a variety of conditions. For example, some videos or frames may show more of the LOC device, show the light emitters of the LOC device from viewpoints that are oriented differently, show the light emitters of the LOC device in different light-emitting states, show the light emitters of the LOC device in different lighting conditions, show the light emitters of the LOC device at a higher magnification, show the light emitters of the LOC device at a lower magnification, show the light emitters of the LOC device from different angles, or show the light emitters of the LOC device from different orientations. For example, FIGS. 11A-F show example embodiments of training frames as the frames appear on the display of a computer-vision device. As illustrated by FIGS. 11A-C, the frames can show the light emitters 1121 of a LOC device from different degrees of magnification. As illustrated by FIGS. 11C-D, the frames can show the light emitters 1121 in different lighting conditions. As illustrated in FIGS. 11D-F, the frames can show the light emitters 1121 from different orientations. And, as illustrated by FIGS. 11A, 11C, and 11E, the frames can show the light emitters in different light-emitting states.

Accordingly, the training data can be selected to train the emitter-state-detection machine-learning model to identify a LOC device's light emitters and their light-emitting states in a variety of conditions.

Figure 12:
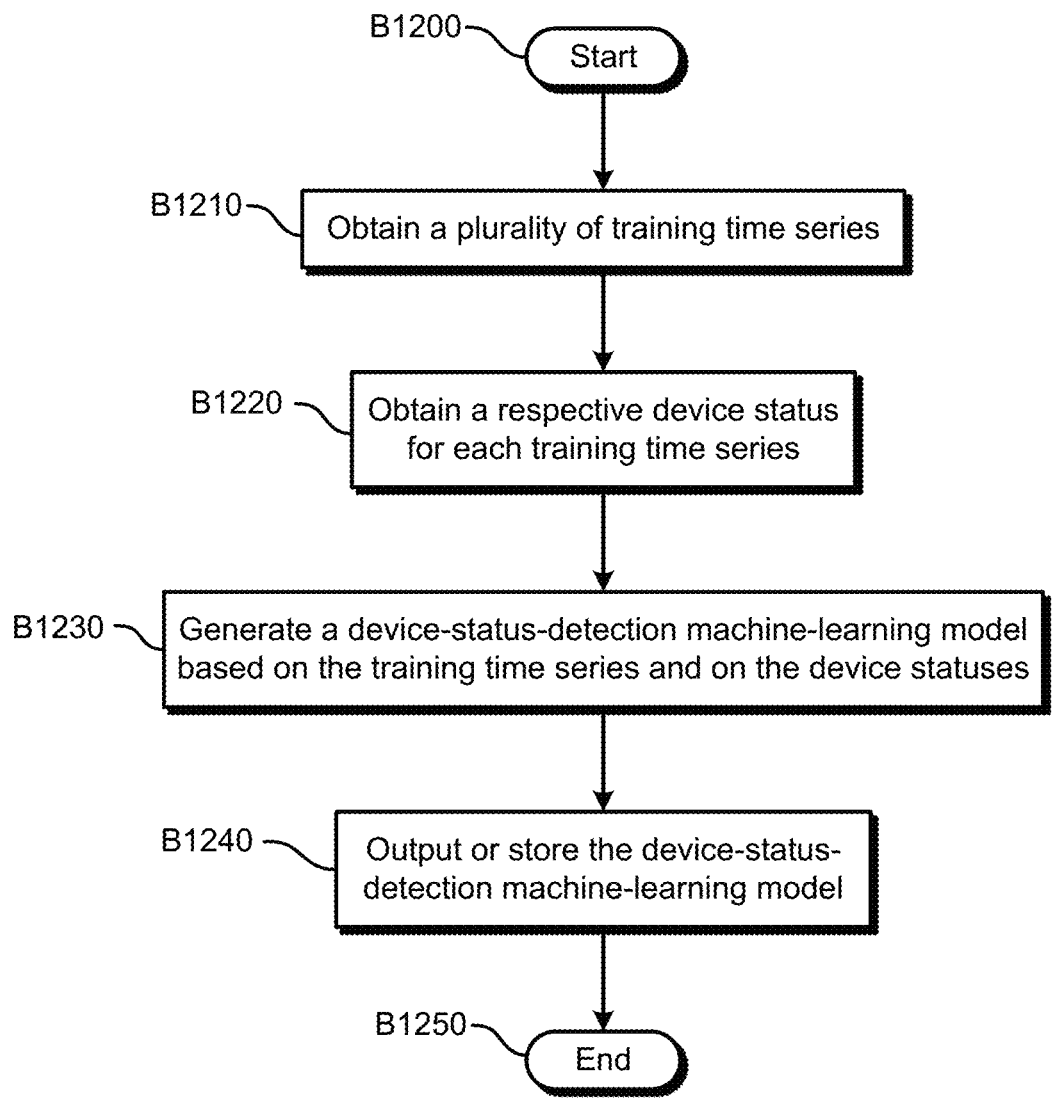
FIG. 12 illustrates an example embodiment of an operational flow for generating a device-status-detection machine-learning model.

FIG. 12 illustrates an example embodiment of an operational flow for generating a device-status-detection machine-learning model. The flow starts in block B1200 and then moves to block B1210, where the model-generation device obtains a plurality of training time series of light-emitting states. Next, in block B1220, the model-generation device obtains a respective device status for each training time series of light-emitting states. The flow then moves to block B1230, where the model-generation device generates (e.g., trains) a device-status-detection machine-learning model based on the plurality of training time series of light-emitting states and on the device statuses. The flow then proceeds to block B1240, where the model-generation device outputs or stores the device-status-detection machine-learning model, and then the flow ends in block B1250.

FIGS. 13A-J illustrate example embodiments of time series of light-emitting states. The embodiments in FIGS. 13A-D all describe the same time series of light-emitting states. As shown by FIG. 13A, the time series of light-emitting states can be described by a table. As shown by FIGS. 13B and 13C, the time series of light-emitting states can be represented by vectors. And as shown by FIG. 13D, the time series of light-emitting states can be represented by a matrix. Also, the embodiments in FIGS. 13E-F illustrate different representations of the same time series of light-emitting states. And the embodiments in FIGS. 13G-J illustrate different representations of the same time series of light-emitting states.

Additionally, as indicated by FIGS. 13A-J, some LOC devices include only one light emitter, and some LOC devices include three or more light emitters.

Figure 14:
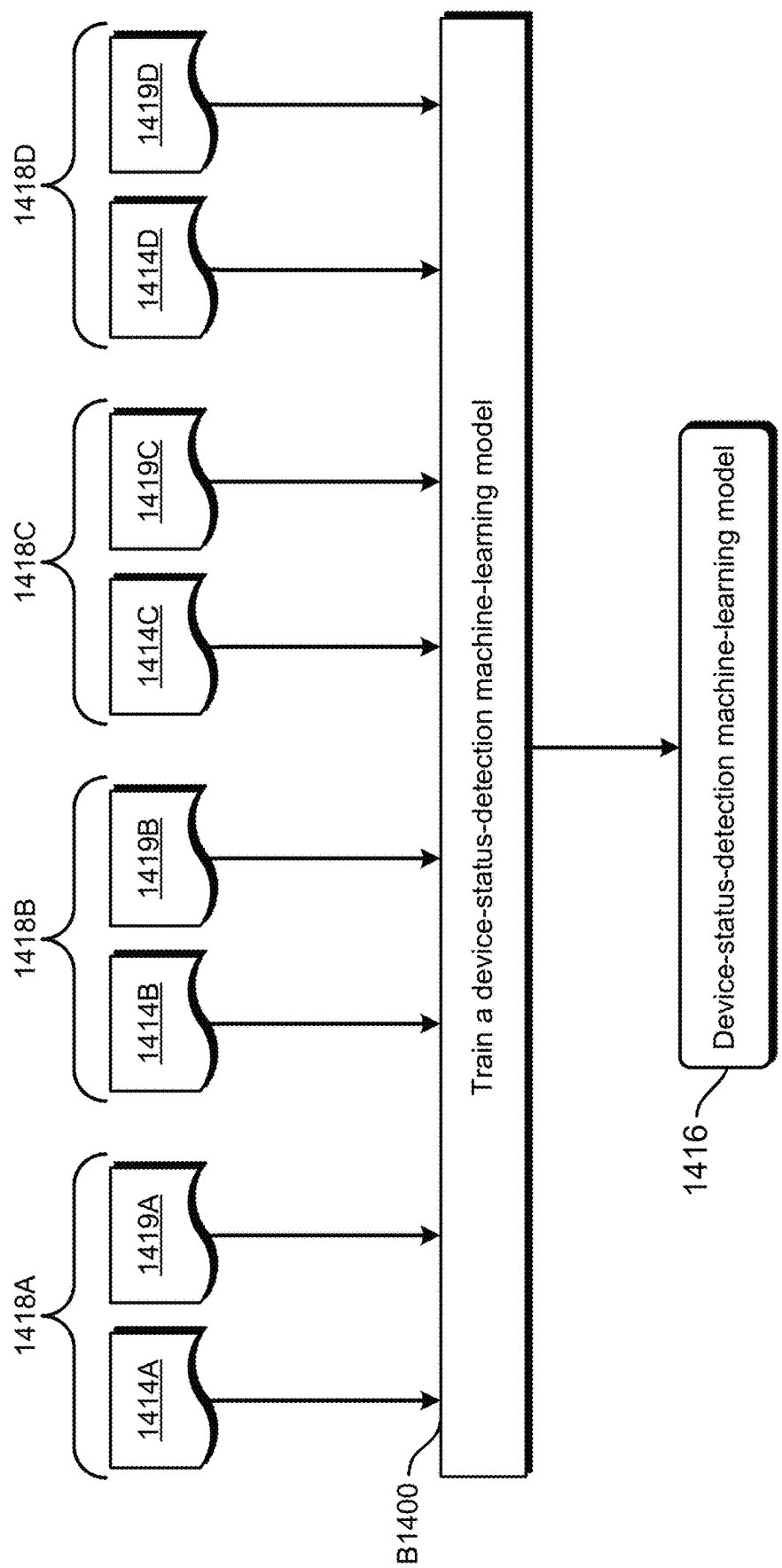
FIG. 14 illustrates an example embodiment of the training of a device-status-detection machine-learning model.

FIG. 14 illustrates an embodiment of the training of a device-status-detection machine-learning model. The inputs to the training are data pairs 1418A-D. Each of the data pairs 1418A-D includes a respective time series of light-emitting states and a device status. In this example, a first data pair 1418A includes a first time series of light-emitting states 1414A and a first device status 1419A, a second data pair 1418B includes a second time series of light-emitting states 1414B and a second device status 1419B, a third data pair 1418C includes a third time series of light-emitting states 1414C and a third device status 1419C, and a fourth data pair 1418D includes a fourth time series of light-emitting states 1414D and a fourth device status 1419D. The data pairs 1418A-D are input to block B1400, where a model-generation device trains a device-status-detection machine-learning model 1416 based on the data pairs 1418A-D.

Figure 15:
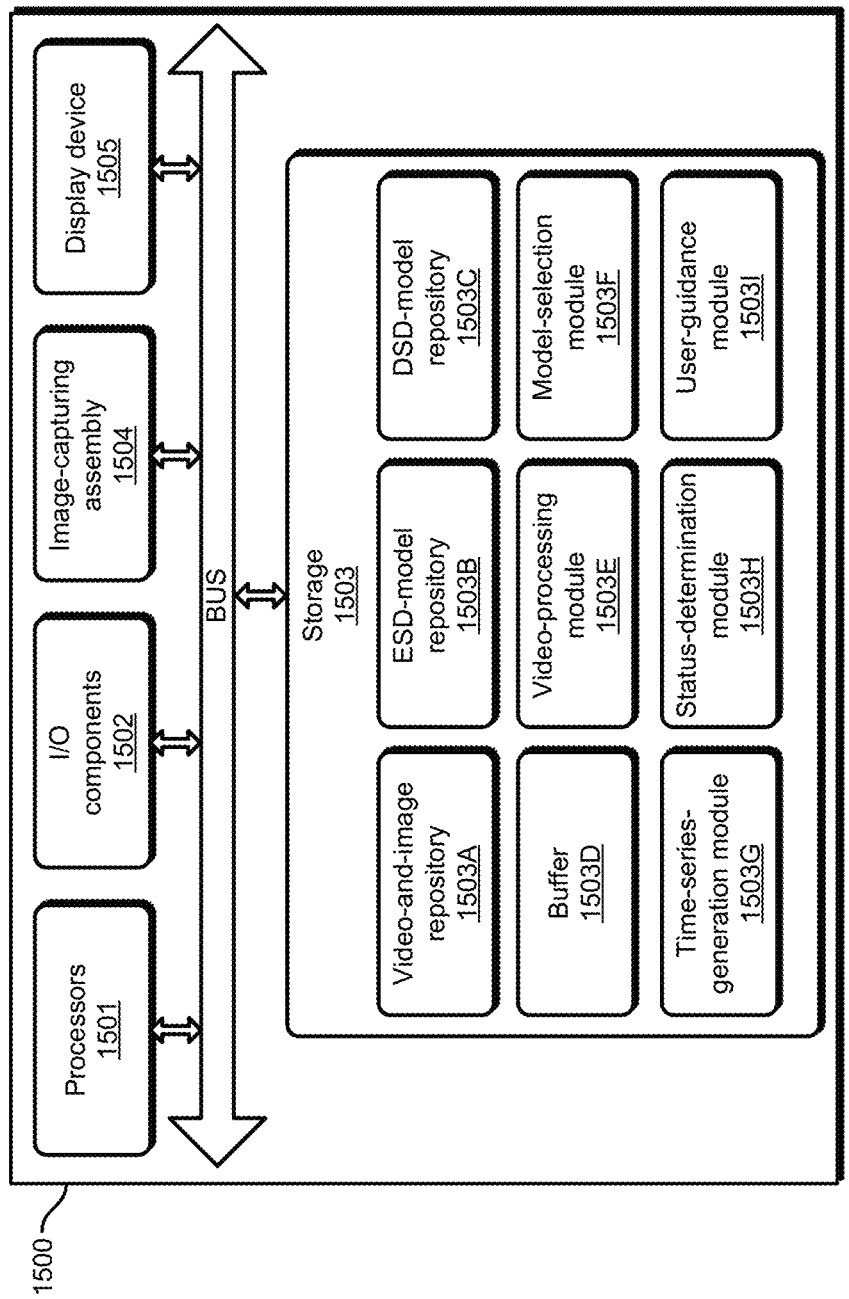
FIG. 15 illustrates an example embodiment of a computer-vision device.

FIG. 15 illustrates an example embodiment of a computer-vision device. The computer-vision device 1500 includes one or more processors 1501, one or more I/O components 1502, storage 1503, an image-capturing assembly 1504, and a display device 1505. Also, the hardware components of the computer-vision device 1500 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 1501 include one or more central processing units (CPUs), which include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital-signal processors (DSPs); or other electronic circuitry (e.g., other integrated circuits). The I/O components 1502 include communication components (e.g., a graphics card, a network-interface controller) that communicate with other computing devices (not illustrated) and other input or output devices (not illustrated), which may include a keyboard, a mouse, a printing device, a touch screen, a light pen, an optical-storage device, a scanner, a microphone, a drive, and a game controller (e.g., a joystick, a control pad).

The storage 1503 includes one or more computer-readable storage media. As used herein, a computer-readable storage medium is a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1503, which may include either or both ROM and RAM, can store computer-readable data or computer-executable instructions.

The image-capturing assembly 1504 includes one or more image sensors and may include one or more lenses and an aperture. The image-capturing assembly 1504 may be configured to capture both videos and still images. The display device 1505 includes a display screen, and the display device 1505 may include a touch screen.

The computer-vision device 1500 also includes a video-and-image repository 1503A, an emitter-state-detection-model repository 1503B (ESD-model repository 1503B), a device-status-detection-model repository 1503C (DSD-model repository 1503C), a buffer 1503D, a video-processing module 1503E, a model-selection module 1503F, a time-series-generation module 1503G, a status-determination module 1503H, and a user-guidance module 1503I. A module includes logic, computer-readable data, or computer-executable instructions. In the embodiment shown in FIG. 15, the modules are implemented in software (e.g., Assembly, C, C++, C#, Java, BASIC, Pert, Visual Basic, Python). However, in some embodiments, the modules are implemented in hardware (e.g., customized circuitry) or, alternatively, a combination of software and hardware. When the modules are implemented, at least in part, in software, then the software can be stored in the storage 2003. Also, in some embodiments, the computer-vision device 1500 includes additional or fewer modules, the modules are combined into fewer modules, or the modules are divided into more modules.

The video-and-image repository 1503A stores one or more videos, one or more frames from videos, or other still images, for example the videos and frames that are obtained, generated, or used by the operations in FIG. 3, FIG. 4, FIG. 5, FIG. 6, FIG. 7, FIG. 8, FIG. 9, and FIG. 10.

The emitter-state-detection-model repository 1503B stores one or more emitter-state-detection machine-learning models, for example the emitter-state-detection machine-learning model 313 in FIG. 3, the emitter-state-detection machine-learning model 513 in FIG. 5, the emitter-state-detection machine-learning model 913 in FIG. 9, the emitter-state-detection machine-learning model 1013 in FIG. 10, and the emitter-state-detection machine-learning models that are obtained, generated, selected, or used by the operations in blocks B420 and B440 in FIG. 4, in blocks B615 and B625 in FIG. 6, in blocks B720 and B725 in FIG. 7, and in blocks B830 and B840 in FIG. 8.

The device-status-detection-model repository 1503C stores one or more device-status-detection machine-learning models, for example the device-status-detection machine-learning model 316 in FIG. 3, the device-status-detection machine-learning model 1416 in FIG. 14, and the device-status-detection machine-learning models that are obtained, generated, selected, or used by the operations in blocks B420 and B450 in FIG. 4, in blocks B615 and B650 in FIG. 6, in blocks B720 and B755 in FIG. 7, and in blocks B1230 and B1240 in FIG. 12.

The buffer 1503D stores one or more time series of light-emitting states and may be, for example, the memory buffer used in blocks B730-B735 in FIG. 7. Also for example, the buffer 1503D may store the time series of light-emitting states 314 in FIG. 3, the time series of light-emitting states in block B440 in FIG. 4, the time series of light-emitting states 514 in FIG. 5, or the time series of light-emitting states in block B630 in FIG. 6.

The video-processing module 1503E includes instructions that cause the computer-vision device 1500 to capture or otherwise obtain one or more videos, to deconstruct the one or more videos into frames, to add time indexes to the frames, or to identify devices in the videos. For example, some embodiments of the video-processing module 1503E include instructions that cause the computer-vision device 1500 to perform at least some of the operations that are described in block 430 in FIG. 4, in block B620 in FIG. 6, or in blocks B710-B715 in FIG. 7.

The model-selection module 1503F includes instructions that cause the computer-vision device 1500 to select one or more machine-learning models, for example as described in block B420 in FIG. 4, in block B615 in FIG. 6, or in block B720 in FIG. 7.

The time-series-generation module 1503G includes instructions that cause the computer-vision device 1500 to generate a time series of light-emitting states by inputting at least part of a video (e.g., one or more frames) into an emitter-state-detection machine-learning model, for example as described in block B440 in FIG. 4, in block B625 in FIG. 6, or in block B725 in FIG. 7.

The status-determination module 1503H includes instructions that cause the computer-vision device 1500 to generate one or more device-status indicators by inputting one or more time series of light-emitting states into a device-status-detection machine-learning model and that cause the computer-vision device 1500 to output or store the one or more device-status indicators, for example as described in blocks B450-B460 in FIG. 4, in block B650 in FIG. 6, or in blocks B755-B760 in FIG. 7.

The user-guidance module 1503I includes instructions that cause the computer-vision device 1500 to display user guidance, for example as described in block B660 in FIG. 6.

Figure 16:
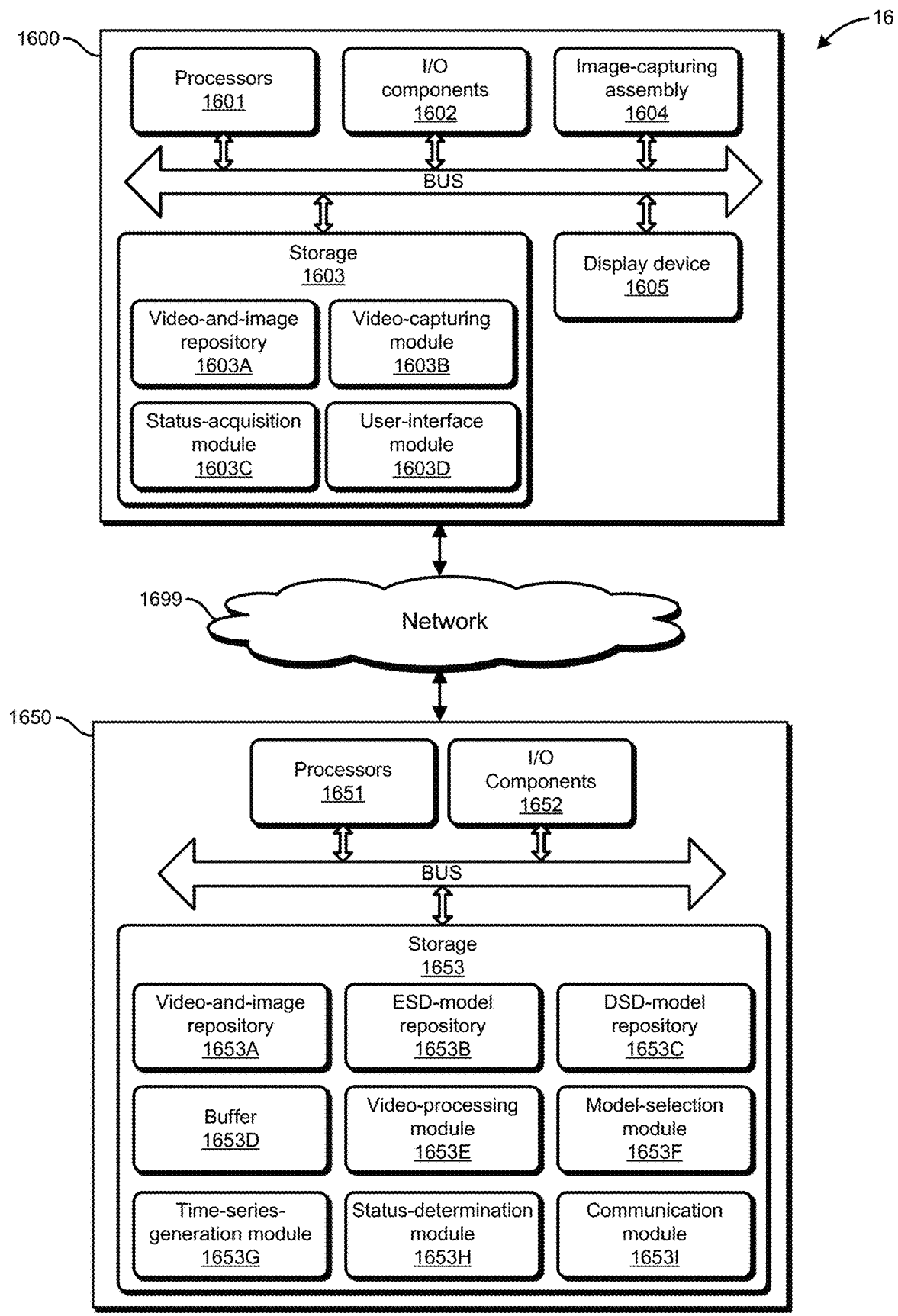
FIG. 16 illustrates an example embodiment of a device-status-detection system.

FIG. 16 illustrates an example embodiment of a device-status-detection system. The device-status-detection system 16 includes a computer-vision device 1600 and a remote computing device 1650. In this embodiment, the computer-vision device 1600 and the remote computing device 1650 communicate via one or more networks 1699, which may include a wired network, a wireless network, a LAN, a WAN, a MAN, and a PAN. For example, the one or more networks 1699 may include a cellular network. Also, in some embodiments of the system 16, the devices communicate via other wired or wireless channels.

The computer-vision device 1600 includes one or more processors 1601, one or more I/O components 1602, storage 1603, an image-capturing assembly 1604, and a display device 1605. Also, the computer-vision device 1600 includes a video-and-image repository 1603A, a video-capturing module 1603B, a status-acquisition module 1603C, and a user-interface module 1603D.

The video-capturing module 1603B includes instructions that cause the computer-vision device 1600 to use the image-capturing assembly 1604 to capture one or more videos, which can be stored in the video-and-image repository 1603A.

The status-acquisition module 1603C includes instructions that cause the computer-vision device 1600 to send one or more videos and one or more requests for a device-status indicator to the remote computing device 1650 and cause the computer-vision device 1600 to receive one or more device-status indicators from the remote computing device 1650.

The user-interface module 1603D includes instructions that cause the computer-vision device 1600 to display a user interface that allows a user to enter an identification of a LOC device, to display a device-status indicator, or to display user guidance. For example, some embodiments of the user-interface module 1603D include instructions that cause the computer-vision device 1600 to perform at least some of the operations that are described in blocks B410 and B460 in FIG. 4, in blocks B610 and B660 in FIG. 6, or in block B760 in FIG. 7.

The remote computing device 1650 includes one or more processors 1651, one or more I/O components 1652, and storage 1653. Also, the computer-vision device 1600 includes a video-and-image repository 1653A, an emitter-state-detection-model repository 1653B (ESD-model repository 1653B), a device-status-detection-model repository 1653C (DSD-model repository 1653C), a buffer 1653D, a video-processing module 1653E, a model-selection module 1653F, a time-series-generation module 1653G, a status-determination module 1653H, and a communication module 1653I.

The video-processing module 1653E includes instructions that cause the remote computing device 1650 to deconstruct one or more videos into frames, to time index the frames, or to identify devices in the videos. For example, some embodiments of the video-processing module 1503E include instructions that cause the remote computing device 1650 to perform at least some of the operations that are described in block 430 in FIG. 4, in block B620 in FIG. 6, or in blocks B710-B715 in FIG. 7.

The model-selection module 1653F includes instructions that cause the remote computing device 1650 to select one or more machine-learning models, for example as described in block B420 in FIG. 4, in block B615 in FIG. 6, or in block B720 in FIG. 7. In some embodiments, this selection is based on one or more identifications (e.g., user-input identifications) that are obtained from the computer-vision device 1600.

The communication module 1653I includes instructions that cause the remote computing device 1650 to communicate with the computer-vision device 1600, for example to obtain one or more videos from the computer-vision device 1600, to obtain one or more identifications from the computer-vision device 1600, or to send one or more device-status indicators to the computer-vision device 1600.

Figure 17:
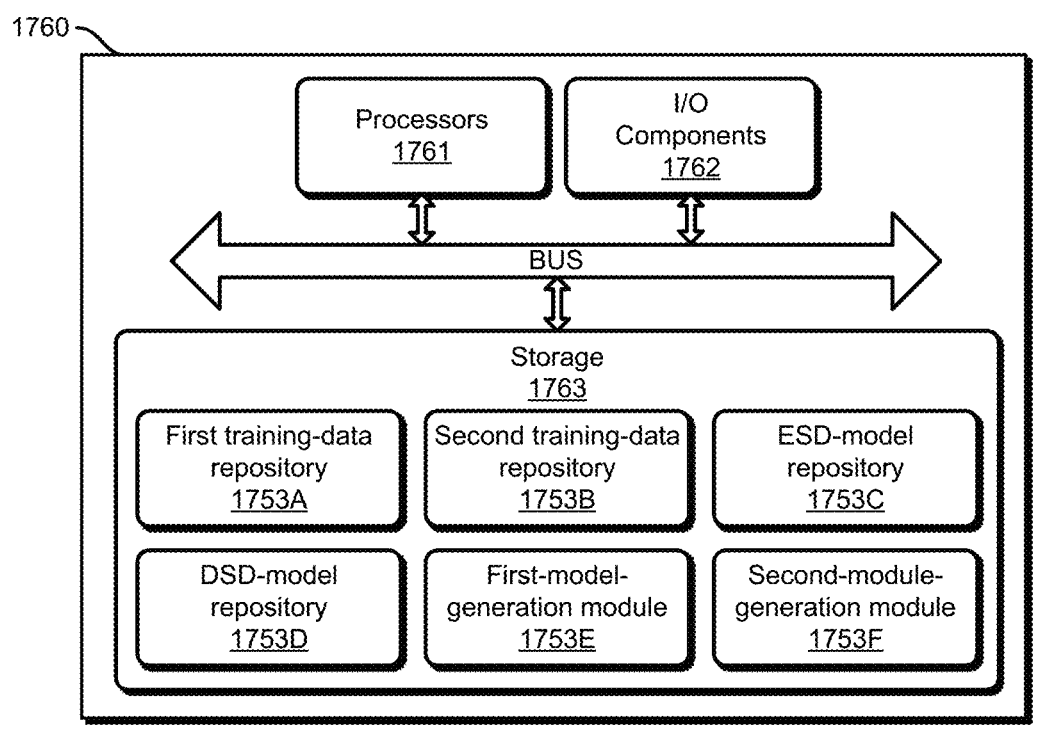
FIG. 17 illustrates an example embodiment of a model-generation device.

FIG. 17 illustrates an example embodiment of a model-generation device. The model-generation device 1760 includes one or more processors 1761, one or more I/O components 1762, and storage 1763. Also, the model-generation device includes a first training-data repository 1753A, a second training-data repository 1753B, an emitter-state-detection-model repository 1753C (ESD-model repository 1753C), a device-status-detection-model repository 1753D (DSD-model repository 1753D), a first-model-generation module 1753E, and a second-model-generation module 1753E.

The first training-data repository 1753A includes data for generating (e.g., training) one or more emitter-state-detection machine-learning models. The data may include one or more videos, one or more video frames, one or more light-emitting states, or one or more time series of light-emitting states, for example the training videos and time series of light-emitting states that are described in blocks B810-B820 in FIG. 8, the data pairs 917A-D in FIG. 9, and the data pairs 1017A-D in FIG. 10.

The second training-data repository 1753B includes data for generating (e.g., training) one or more device-status-detection machine-learning models. The data may include one or more time series of light-emitting states and one or more device statuses, for example the time series of light-emitting states and device statuses described in blocks B1210-B1220 in FIG. 12 and the data pairs 1418A-D in FIG. 14.

The first-model-generation module 1753E includes instructions that cause the model-generation device 1760 to generate one or more emitter-state-detection machine-learning models based on one or more videos, on one or more frames, on one or more light-emitting states, or on one or more time series of light-emitting states. Also, the first-model-generation module 1753E includes instructions that cause the model-generation device 1760 to store the generated one or more emitter-state-detection machine-learning models in the emitter-state-detection-model repository 1753C. Additionally, for example, some embodiments of the first-model-generation module 1753E include instructions that cause the model-generation device 1760 to perform the operations that are described in blocks B800-B850 in FIG. 8, in block B900 in FIG. 9, or in block B1000 in FIG. 10.

The second-model-generation module 1753F includes instructions that cause the model-generation device 1760 to generate one or more device-status-detection machine-learning models based on one or more light-emitting states, on one or more time series of light-emitting states, or on one or more device statuses. Also, the second-model-generation module 1753F includes instructions that cause the model-generation device 1760 to store the generated one or more device-status-detection machine-learning models in the device-status-detection-model repository 1753D. Additionally, for example, some embodiments of the second-model-generation module 1753F include instructions that cause the model-generation device 1760 to perform the operations that are described in blocks B1200-B1250 in FIG. 12 or in block B1400 in FIG. 14.

Additionally, some embodiments of the devices, systems, and methods combine features from two or more of the embodiments that are described herein. Also, as used herein, the conjunction "or" generally refers to an inclusive "or," though "or" may refer to an exclusive "or" if expressly indicated or if the context indicates that the "or" must be an exclusive "or."

The invention claimed is:

1. An apparatus comprising:
one or more computer-readable storage media; and
one or more processors that are configured to cause the apparatus to perform operations including:
obtaining a video of a device, wherein the device includes one or more light emitters that are visible in the video;
inputting the video to a first machine-learning model and executing the first machine-learning model, wherein the first machine-learning model outputs a time series of light-emitting states that indicates respective light-emitting states of the light emitters at respective times in the time series; and
inputting the time series of light-emitting states to a second machine-learning model and executing the second machine-learning model, wherein the second machine-learning model outputs a status indicator of the device.

2. The apparatus of claim 1, wherein the status indicator indicates an error status, a network-communication status, or a power status.

3. The apparatus of claim 1, wherein the device is a printer, a scanner, or a multi-function device.

4. The apparatus of claim 1, wherein the video is input to the first machine-learning model as a series of time-indexed frames.

5. The apparatus of claim 1, wherein the light-emitting states indicate the respective light-emitting states of the light emitters in each time-indexed frame in the series of time-indexed frames.

6. The apparatus of claim 1, wherein the time series of light-emitting states is output into a buffer in the one or more computer-readable media, and wherein inputting the time series of light-emitting states to the second machine-learning model includes inputting contents of the buffer to the second machine-learning model.

7. The apparatus of claim 1, wherein the video includes a plurality of frames, and
wherein inputting the video to the first machine-learning model and executing the first machine-learning model includes invoking the first machine-learning model on each frame of the plurality of frames, wherein, for each frame of the plurality of frames, the first machine-learning model outputs a respective time-indexed light-emitting state for each of the one or more light emitters, and wherein the time series of light-emitting states includes the respective time-indexed light-emitting state for each of the one or more light emitters for each frame of the plurality of frames.

8. A method comprising:

obtaining a video of a device, wherein the device includes one or more light emitters that are visible in the video;

generating a series of time-indexed frames based on the video;

executing a first machine-learning model using the series of time-indexed frames as inputs, wherein the first machine-learning model outputs a time-indexed series of light-emitting states that indicate respective light-emitting states of the one or more light emitters at respective times in the time-indexed series; and executing a second machine-learning model using the time-indexed series of light-emitting states as inputs, wherein the second machine-learning model outputs a status indicator of the device.

9. The method of claim 8, wherein the light-emitting states indicate the respective light-emitting states of the light emitters in the time-indexed frames.

10. The method of claim 8, further comprising:

storing the time-indexed series of light-emitting states as contents in a buffer on a computer-readable medium, and inputting the contents of the buffer to the second machine-learning model.

11. The method of claim 8, wherein at least one of the one or more light emitters is configured to blink when the device is in an error state.

12. The method of claim 8, further comprising:

identifying a model of the device.

13. One or more non-transitory computer-readable storage media storing computer-executable instructions that, when executed by one or more computing devices, cause the one or more computing devices to perform operations comprising:

obtaining training data, wherein the training data includes time-indexed frames of at least one video of a device, wherein the device includes one or more light emitters, wherein the one or more light emitters are visible in the time-indexed frames, and wherein the training data indicates a respective light-emitting state of each of the one or more light emitters in each of the time-indexed frames;

training a first machine-learning model based on the training data, wherein the first machine-learning model accepts time-indexed frames as inputs and outputs a time-indexed series of light-emitting states that indicates respective light-emitting states of the one or more light emitters at respective times; and training a second machine-learning model based on a plurality of time-indexed series of light-emitting states and on data that maps operating statuses of the device to respective time-indexed series of light-emitting states, wherein the operating statuses include one or more error statuses, and wherein the second machine-learning model accepts a time-indexed series of light-emitting states as an input and outputs an operating status of the device.

14. The one or more non-transitory computer-readable storage media of claim 13, wherein the device is a printer.

15. The one or more non-transitory computer-readable media of claim 14, wherein the one or more error statuses include at least one of the following: paper jam, out of paper, out of toner, and out of ink.

16. The one or more non-transitory computer-readable media of claim 13, wherein the device includes at least two light emitters.

17. The one or more non-transitory computer-readable media of claim 13, wherein at least one of the first machine-learning model and the second machine-learning model is a neural network.

18. The one or more non-transitory computer-readable media of claim 13, wherein the training data includes time-indexed frames of at least two videos of the device.

* * * * *